July 19, 1932. E. BRANDT 1,868,345
LOCKING DEVICE
Filed April 10, 1931 3 Sheets-Sheet 2
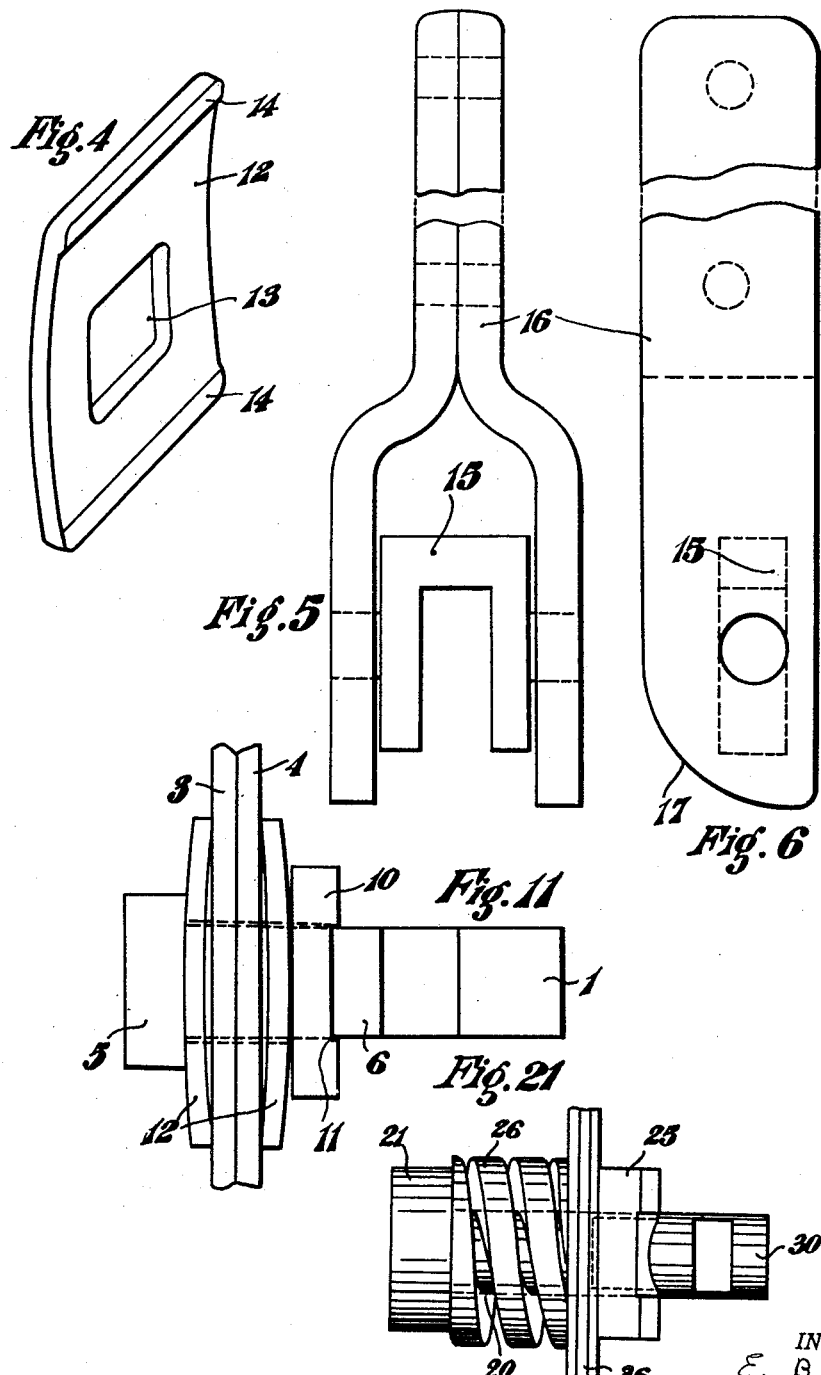
INVENTOR:
E. Brandt
BY
ATTORNEYS

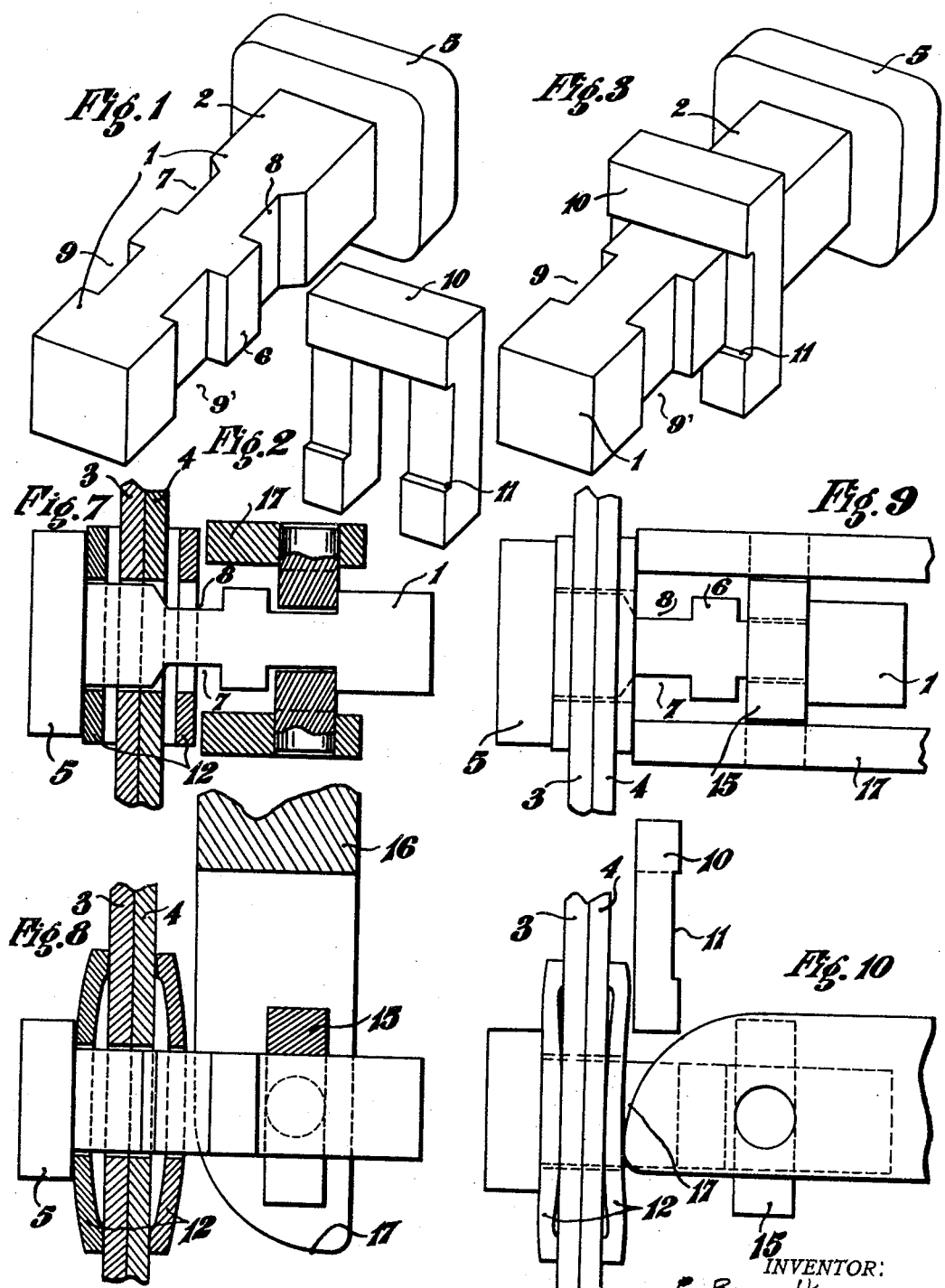

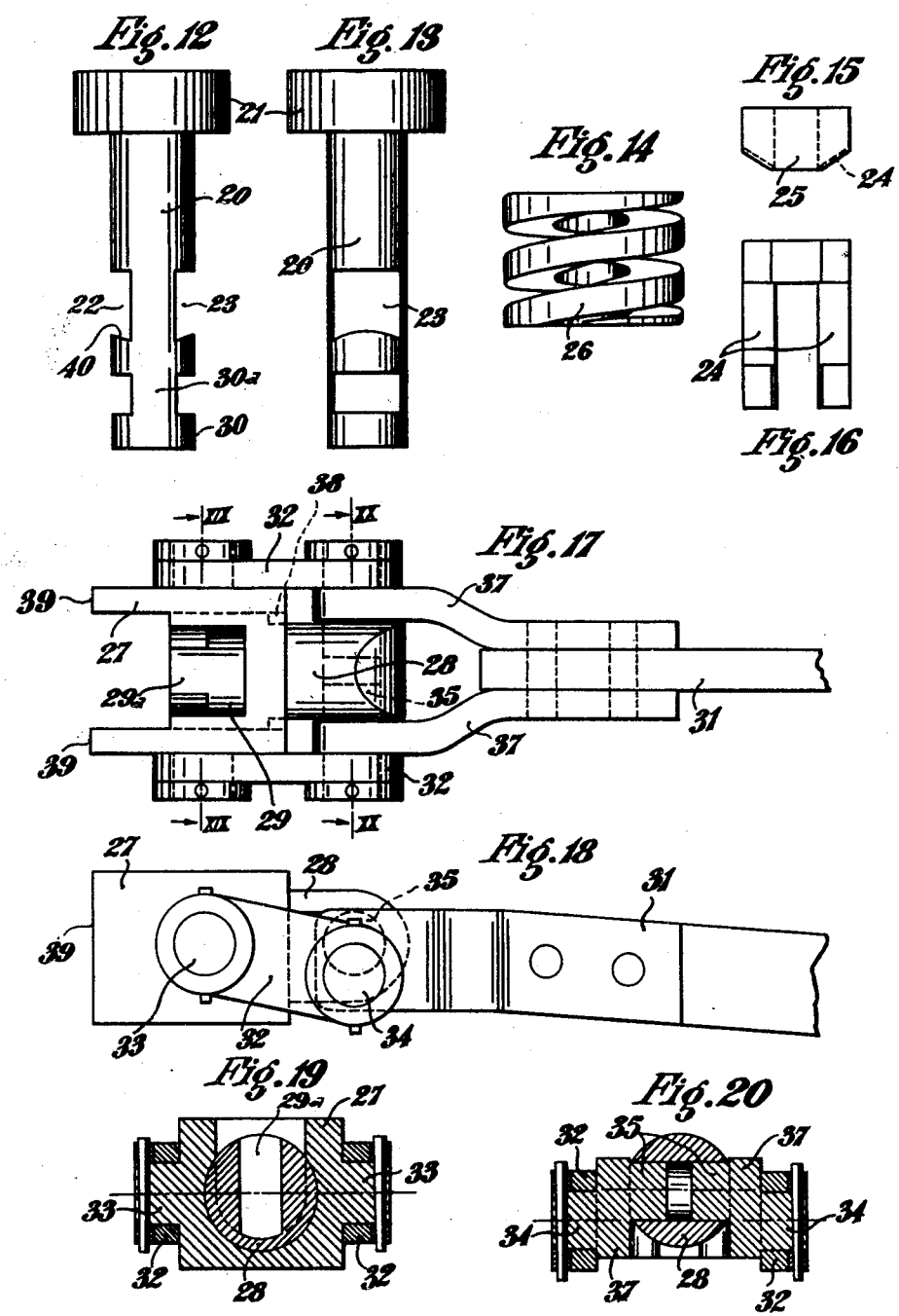

Patented July 19, 1932

1,868,345

UNITED STATES PATENT OFFICE

EUGENE BRANDT, OF GENEVA, SWITZERLAND

LOCKING DEVICE

Application filed April 10, 1931, Serial No. 529,267, and in France June 16, 1930.

This invention relates to a locking device and has for its primary object to provide connection means to detachably but rigidly secure together two or more members. Another object is to provide a locking device which may advantageously replace the usual screw bolt and nut connections and for this purpose the device consists in a bolt traversing registering holes in the members to be secured together and being provided with a head on one side of said members and with a seat portion on the other side of said members, a key being engaged on the bolt between said seat portion and said members, and spring means being provided between the head on the bolt and said key to force the members against each other and the key against said seat portion.

A further object is the provision of a fitting-up tool engageable with the bolt and operable to move the members to be connected towards the head on the bolt to allow engagement of said key with the seat portion on the bolt.

The invention is hereinafter more fully described and illustrated in the accompanying drawings, in which Figure 1 is a perspective view of a bolt used in the device according to the invention.

Figure 2 is a perspective view of key which is adapted to maintain the members to be connected engaged on the bolt.

Figure 3 shows the key in position on the bolt.

Figure 4 shows a spring which is used to provide pressure on the members to be connected.

Figure 5 is a plan view of a tool which may be used in making the connection.

Figure 6 is a side view of the tool.

Figures 7 to 10 illustrate the manner of operation in making the connection.

Figure 11 is an elevation of an assembled locking device.

Figures 12 and 13 are front and side elevation of a bolt used in a locking arrangement according to a second form of construction.

Figure 14 shows a spring used in this modification.

Figures 15 and 16 show a modified key used in the second form of construction.

Figures 17 and 18 are plan view and side view of a modified tool.

Figure 19 is a section on line XIX—XIX of Fig. 17.

Figure 20 is a section on line XX—XX of Fig. 17.

Figure 21 shows an assembled locking device according to the second form of construction.

In the embodiment shown in Figures 1 to 11, 1 indicates a rod or bolt of substantially square cross section. This cross section could be also rectangular, circular or elliptic for instance.

The bolt 1 comprises a portion 2 over which are placed the two members which are to be joined or pressed together, two metal sheets 3 and 4 which may be portions of a two winged door for garages, airplane halls or the like. At one of its ends and adjacent the portion 2, the bolt 1 is provided with a head 5. Adjacent the other side of the portion 2 there are provided two oppositely disposed parallel grooves 7 and 8. Between these two grooves and two further grooves 9 and 9′ the bolt forms a seat portion 6. 10 indicates a key formed by a U-shaped member which is adapted to be introduced with its two branches in the grooves 7 and 8 as shown in Figure 3. The two branches of this key 10 are provided on their faces adjacent the stop piece 6 with a recess 11 having the height of the seat portion 6 and by means of which recess the key 10 is engaged on the member 6. Figure 4 illustrates a spring formed by a resilient plate provided with a central opening 13 to permit engagement of the spring on the rod 1. This plate is curved so as to be concave on one face and convex on the other and presents two opposite flat abutting edges 14.

Figure 11 shows the device in working position where the two members 3 and 4 of a door are pressed together. This pressure is obtained by means of the key 10 forcing against the head 5 the two members 3 and 4 and two springs 12, one of the springs being placed between the member 3 and the head 5 and the other spring between the members 4 and the key 10. The pressure of the springs acting on the key 10 maintains the recess 11 of the key in engagement with the seat portion 6.

It is understood that one, two or several springs 12 could be used on either side of the members 3 and 4 according to the amount of pressure one desires to obtain. Engagement of the key 10, the members 3 and 4 and the springs 12 on the bolt 1 between the head 5 and the seat 6 is obtained by means of a tool such as represented by Figures 5 and 6. This tool comprises a U-shaped member 15 on which pivots a forked handle 16 of which the ends of the prongs are eccentrically curved relative to the pivot as indicated at 17. By means of this tool, the locking of the two members 3 and 4 on the rod 1 is obtained in the following manner described with reference to Figures 7 to 10.

First one of the springs 12 is placed near the head 5 on the bolt and then the two members 3 and 4 and the second spring 12. Afterwards the U-shaped piece 15 of the tool is inserted with its branches in the two grooves 9 and 9' with the handle 16 turned upwards as shown in Figure 8. When then the handle 16 is turned for one quarter of a revolution so as to come into horizontal position as seen in Figure 10, the curved end 17 of the fork presses the two members 3 and 4 and the two springs 12 against the head 5 of the bolt 1 and it is then possible to insert the key 10 between the two prongs of the handle 16 into the grooves 7 and 8 of the bolt.

The pressure of the springs 12 maintains the recess 11 of the key in engagement with the seat portion 6 after the tool has been withdrawn from the bolt 1. In order to unlock the two members 3 and 4 the tool is replaced in its position on the bolt 1 and pressure is exerted with the end 17 on the spring 12. The key can then be moved axially on the rod in order to disengage the recess 11 from the stop piece 6 and then it can be taken out of the grooves 7 and 8. The two flat edges 14 of the springs facilitate the sliding movement of the springs on the member 3 and 4 when the springs are compressed by the tool.

The described device can be used with advantage in many cases instead of screw bolt and nut for connecting two members. When a bolt and nut connection is not provided with a special nut locking device loosening of the nut can be frequently observed. No such loosening is possible with the described connection means; another advantage consists in that the two members 3 and 4, owing to the resiliency of the springs 12, are given the possibility of free dilation and concentration under the influence of changes in temperature.

Moreover, with nuts it is not possible to determine the exact pressure exerted on the members which are to be connected, but with the springs 12 the pressure can be regulated at will by using one or several springs 12 of which the individual pressure is known. Play resulting from wear of the parts will be taken up by the elasticity of the springs 12 and in case wear should be excessive one can add another spring between the key 10 and the head 5.

Preferably the key 10 will be provided on both sides of its branches with a recess 11 so that no special attention has to be given in which way this key is inserted into the grooves 7 and 8.

Instead of providing only one pair of grooves 7 and 8, there could be cut two or more pairs of such grooves in the rod 1, in order to be able to use the same bolt 1 for members 3 and 4 of different thickness. In this case, the first pair of grooves will be cut into the lateral faces of the rod 1, the second pair into the upper and lower faces and the following pair again into the lateral faces.

The second embodiment according to Figures 12 to 16 comprises a bolt 20 of circular cross section. This bolt is provided with a head 21 and with two opposite grooves 22 and 23 into which the branches 24 of the key 25 are inserted. The spring plates used in the first form of construction are in this case replaced by a helicoidal spring 26.

In order to connect two members by means of this device a tool according to Figures 17 to 20 is used. This tool comprises a block 27 provided with a bore 38 along which is adapted to slide a generally cylindrical core 28 provided with recesses 29 and 29a in which the end 30 and the portion 30a of the bolt 20 can be engaged. The block 27 is provided with journals 33 on which links 32 are engaged for connection of the block 27 to journals 34 provided on jaws 37 of crank pins 35. The two pins 35 are rotatably mounted in the core 28, while the two jaws 37 are connected to a handle 31.

Figure 21 shows a connection made by means of the described device. In order to make this connection the helicoidal spring 26 is first introduced over the bolt 1 and then three metal sheets 36 which have to be united are placed over the bolt. The parts 30 and 30a of the bolt are then engaged in the recesses 29 and 29a of the member 28 of the tool while the handle 31 and the crank jaws 37 are held in substantially horizontal position, the end faces 39 of the block 27 being in contact with the metal sheets 36. When now the handle 31 is lowered the crank pins 35 turn in clockwise direction around the centers of the journals 34 as seen in Figure 18 what produces a displacement from left to right of the core 28 relative to the block 27. The faces 39 of the block 27 therefore act on the metal sheets 36 and compress the spring 26 so that the key 25 can be inserted into the grooves 22 and 23. One end of the grooves 22 and 23 is dovetailed as shown at 40 and cooperates with the correspondingly bevelled faces of the recesses 24 of the key 25. This dovetailing of the grooves prevents the possibility that the two branches of the key 25 could be spread open by pressure exerted upon them and fall out of engagement with the grooves.

I claim:

1. In a clamping and locking device, in combination with a rod passing through registering openings in members to be clamped and provided with a bearing member on one side of said members and with a plurality of pairs of lateral grooves on the other side of said members, a fitting-up tool comprising a recessed member adapted to fit into one of said pairs of lateral grooves on the rod, a handle section pivoted on said recessed member, and means on the handle section for moving the members to be clamped against said bearing member on the rod upon rotation of the handle section relative to the recessed member.

2. In a clamping and locking device, in combination with a rod adapted to pass through registering openings in members to be clamped and provided with a bearing member on one side of said members and with an abutment on the other side for engaging a key to retain said members against said bearing member, said rod being provided with a pair of lateral grooves, of a fitting-up tool comprising a recessed member adapted to engage with the grooved portion of the rod, a handle section pivoted on said recessed member, and means coacting with the handle section for moving the member to be clamped against said bearing member on the rod upon rotation of the handle section relative to the recessed member.

3. In a clamping and locking device, the combination with a bolt having a head and a plurality of pairs of lateral grooves and adapted to pass through registering openings in members to be clamped, of a U-shaped key fitting into one of said pairs of grooves on the bolt for retaining said members against the head of the bolt, a fitting-up tool comprising a U-shaped member adapted to fit into another of said pairs of grooves on the bolt, a lever pivotally connected to said U-shaped member, one end of said lever carrying a fork-shaped cam adapted to bear against said members to be clamped for moving the members towards the head of the bolt upon rotation of the lever to permit insertion of the key into one of said pairs of grooves.

4. In a clamping and locking device, the combination with a bolt having a head and a plurality of pairs of lateral grooves and adapted to pass through registering openings in members to be clamped, of a key adapted to fit in one of said pairs of grooves for retaining said members against the head of the bolt, a fitting-up tool comprising a recessed member adapted to fit around the bolt and into another of said pairs of grooves, a piston member slidably fitting over said recessed member and adapted to bear against the members to be clamped, a handle section pivotally mounted on said recessed member, crank pins on said handle sections, and connecting links between said crank pins and said piston member whereby upon rotation of said handle section the piston member is moved relative to the recessed member and the bolt for moving said members to be clamped against the head of the bolt to permit insertion of said key into one of said pairs of grooves on the bolt.

In testimony whereof I affix my signature.
EUGENE BRANDT.